(12) United States Patent
Rajaram

(10) Patent No.: US 7,721,077 B2
(45) Date of Patent: May 18, 2010

(54) PERFORMING ENDIAN CONVERSION

(75) Inventor: Gurumurthy Rajaram, Tamilnadu State (IN)

(73) Assignee: Intel Corporation, Santa Clara, CA (US)

( * ) Notice: Subject to any disclaimer, the term of this patent is extended or adjusted under 35 U.S.C. 154(b) by 383 days.

(21) Appl. No.: 11/873,361

(22) Filed: Oct. 16, 2007

(65) Prior Publication Data

US 2008/0140992 A1 Jun. 12, 2008

(30) Foreign Application Priority Data

Dec. 13, 2006 (IN) .................. 2670/DEL/2006

(51) Int. Cl.
*G06F 9/315* (2006.01)
(52) U.S. Cl. ................. 712/300; 712/43; 712/229
(58) Field of Classification Search .............. 712/43, 712/229, 300
See application file for complete search history.

(56) References Cited

U.S. PATENT DOCUMENTS

| | | | | |
|---|---|---|---|---|
| 5,446,482 A * | 8/1995 | Van Aken et al. | ........... | 345/589 |
| 5,519,842 A * | 5/1996 | Atallah et al. | ............... | 711/202 |
| 5,524,245 A * | 6/1996 | Zarrin et al. | ................... | 713/2 |
| 5,550,987 A * | 8/1996 | Tanaka | ........................ | 710/106 |
| 5,574,923 A * | 11/1996 | Heeb et al. | .................... | 712/38 |
| 5,781,763 A * | 7/1998 | Beukema et al. | .............. | 710/22 |
| 5,848,436 A * | 12/1998 | Sartorius et al. | ............ | 711/154 |
| 5,903,799 A * | 5/1999 | Saito et al. | ..................... | 399/69 |
| 5,948,099 A * | 9/1999 | Crawford et al. | ............ | 712/225 |
| 6,341,345 B1 * | 1/2002 | Auslander et al. | ........... | 712/204 |
| 6,820,195 B1 * | 11/2004 | Shepherd | ..................... | 712/300 |
| 6,895,489 B2 * | 5/2005 | Qureshi et al. | .............. | 711/202 |
| 7,139,905 B2 * | 11/2006 | Filer et al. | .................... | 712/300 |
| 7,197,625 B1 * | 3/2007 | van Hook et al. | .............. | 712/2 |
| 7,301,541 B2 * | 11/2007 | Hansen et al. | ............... | 345/522 |

* cited by examiner

*Primary Examiner*—William M Treat
(74) *Attorney, Agent, or Firm*—Blakely, Sokoloff, Taylor & Zafman LLP

(57) ABSTRACT

A computing system may support an endian toggle register (ETR) and the endianess of the endian toggle register may be designated using a set endian bit (SEB) or a clear endian bit (CEB) instruction. An endian conversion is performed on the data that is moved into and moved out of the ETR. However, if the destination memory is an endian toggle disabled memory, the contents of the ETR may be transferred to the endian toggle disabled memory without performing the endian conversion. A compiler supported on the computing system may comprise an endian storage class to perform endian conversion, transparently, using high-level languages.

11 Claims, 2 Drawing Sheets

PERFORMING ENDIAN CONVERSION

BACKGROUND

This application claims priority to pending Indian Application number 2670/DEL/2006 filed on Dec. 11, 2006.

A computing system may comprise one or more processors that may store data units in different formats. A system-on-chip may comprise a first and a second processor. The first processor may process a data unit in a big-endian format and the second processor may process a data unit in a little-endian format. The first processor may store the least significant byte (LSB) of a multi-byte data unit in a higher memory location (base address+3) and the most significant byte (MSB) in a lower memory location (base address+0). However, the second processor using a little-endian format may store the LSB of the multi-byte data unit in a lower memory location (base address+0) and the MSB in a higher memory location (base address+3).

The multi-byte data unit that is stored in big-endian format by the first processor may be converted into little-endian format before the second processor retrieves the multi-byte data unit. Such an endian conversion may avoid erroneous interpretation of the multi-byte data units by the second processor. The endian conversion may be performed using software approaches. However, performing the endian conversion using software approaches is prone to errors, which may be difficult to debug. Also, performing endian conversion using software approaches may cause portability issues, while porting the codes between two processors of different endian formats.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes performing endian conversion. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, and digital signals). Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
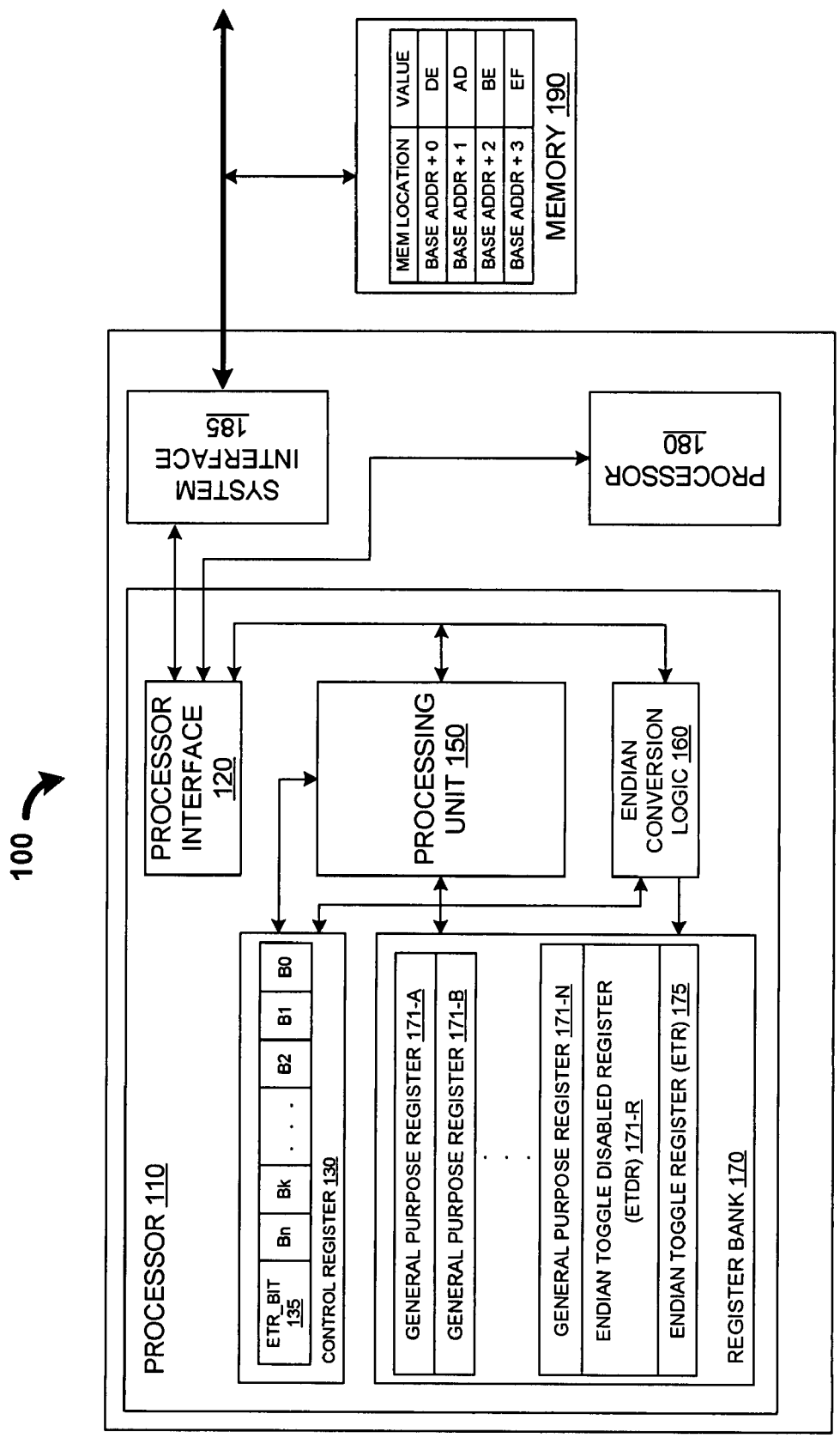
FIG. 1 illustrates an embodiment of a system 100.

An embodiment of a system 100 is illustrated in FIG. 1. In one embodiment, the system 100 may comprise a first processor 110, a second processor 180, and a system interface 185. In one embodiment, the system 100 may represent a network processor, which may comprise a programmable processing unit that may use a first endian format and a programmable control unit that may use a second endian format. In another embodiment, the system may represent a client system comprising a main processor coupled to a chipset comprising one or more processors. The system 100 may be coupled to a memory 190.

The memory 190 may store data units that may be written or retrieved by the processors 110 and 180. In one embodiment, the memory 190 may store the data units provided by the processors 110 and 180 that may be of little-endian, or big-endian, or similar other formats. In one embodiment, the memory 190 may comprise a dynamic random access memory (DRAM) and a static random access memory (SRAM).

The second processor 180 may store a first data unit in big-endian format. For example, the second processor 180 may store the LSB (=EF), of the first data unit A (='0xDEAD-BEEF'), at (base address+3) and the MSB (=DE) at (base address+0). The second processor 180 may use the same format while retrieving the first data unit from the memory 190.

However, the first processor 110 may use little-endian format and may erroneously construe the data unit A stored in the memory 190 as '0xEFBEADDE'(=B). Such an error may occur if the first processor 110 retrieves the data unit before performing endian conversion. Software approaches used to perform endian conversion may be prone to errors and porting the code across processors of different endianess may offer challenges. Detecting and rectifying such errors may be time consuming and cumbersome as well.

In one embodiment, the first processor 110 may comprise a processor interface 120, a control register 130, a processing unit 150, an endian conversion logic 160, and a register bank 170.

In one embodiment, the control register 130 may comprise an endian toggle bit (ETR_bit) 135. In one embodiment, the 'ETR_bit135' field may be set or cleared by the processing unit 150 in response to receiving a 'set ETR bit' (SEB) or a 'clear ETR bit' (CEB) instruction.

In one embodiment, the register bank 170 may comprise general purpose registers 171-A to 171-N and one or more special purpose registers that may be referred to as endian toggle registers 175. In one embodiment, endian toggling may be disabled on one or more of the general purpose registers 171 and such registers may be referred to as endian toggle disabled registers (ETDR). In one embodiment, the register bank 170 may comprise an endian toggle disabled register (ETDR) 171-D.

In one embodiment, the system interface 185 may receive instructions and data units from the memory 190 and may forward the instructions and the data units to the processor interface 120. The processor interface 120 may receive the instructions and the data units from the system interface 185 and may forward the instructions and the data units to the processing unit 150.

The processing unit 150 may process the data units based on the instructions. In one embodiment, the processing unit 150 may receive a SEB instruction and may set the ETR_bit135 of the control register 130. In one embodiment, the processing unit 150 may receive the data unit and may cause the endian conversion to be performed based on the instruction associated with the data unit. In one embodiment, the processing unit 150 may receive an instruction such as MOV ETR, X and may cause endian conversion to be performed on the data unit stored in memory location X before moving the data unit to the ETR175.

In one embodiment, the processing unit 150 may cause the endian conversion to be performed if the data unit is moved in to and moved out of an endian toggle register (ETR) 175. In one embodiment, the ETR175 may operate as a little-endian toggle register if the ETR_bit135 is set and may operate as a big-endian toggle register if the ETR_bit135 is cleared. If the ETR_bit135 is set, the first data unit may be converted from big-endian to little-endian format and then the data unit may be stored in the little-endian format in the ETR175.

Also, while moving out the data unit stored in the ETR 175, the data unit may be converted from little-endian to big-endian format. If the ETR_bit135 is cleared, the data unit may be converted from little-endian to big-endian format and then the data unit may be stored in big-endian format in the ETR175. While the data unit is moved out of the ETR 175, the data unit may be converted from big-endian to little-endian format. In one embodiment, the data unit may be moved in to the ETR175 from the memory 190 or the general purpose registers (GPR) 171-A to N and the data unit may be moved-out of the ETR175 and stored in the memory 190, or GPRs 171-A to N, or ETDR 171-D.

In one embodiment, the processing unit 150 may be implemented using IA-32 Intel® Architecture. In one embodiment, the processing unit 150 may use little-endian format. The size of the ETR175 may vary based on the microprocessor architecture. For example, the size of the ETR175 may equal 16-bits, 32-bits, 64-bits, 128-bits, and similar other sizes.

In one embodiment, the processing unit 150 may transfer the data unit, stored in the ETR175, without causing endian conversion if the destination memory is the ETDR 171-D. In one embodiment, the ETDR 171-D may serve as a storage area for storing the contents of the ETR175. Disabling endian toggling on memories such as the ETDR 171-D and storing the contents of the ETR175 in ETDR 171-D may allow the ETR175 to be used in other operations.

For example, the processing unit 150 may cause the endian conversion logic 160 to perform endian conversion on the data unit A=(0xDEADBEEF) to generate a data unit B (=0xEFBEADDE). The endian conversion logic 160 may then store the data unit B in the ETR175. In one embodiment, the endian conversion logic 160 may comprise, for example, a byte swapping logic that may perform endian conversion.

Figure 2:
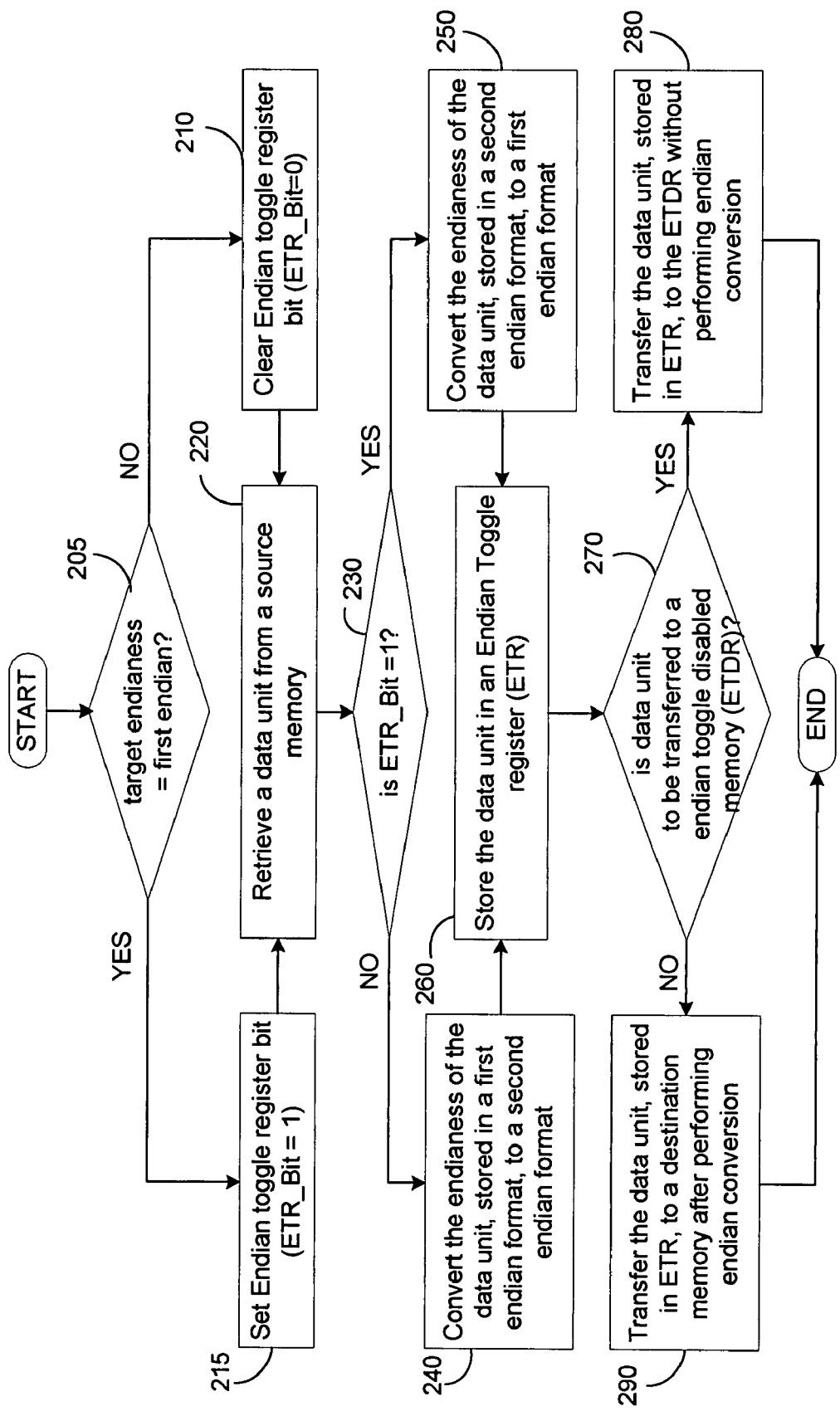
FIG. 2 illustrates an embodiment of the system 100 performing endian conversion transparently.

An embodiment of the system 100 performing endian conversion transparently is illustrated in FIG. 2. In block 205, a user may check if the target endianess equals a first endian format. In one embodiment, the user may determine the target endianess based on the data provided by the vendor of the processor 110. In one embodiment, the user may check if the endianess of the processor 110 equals little-endian and control may pass to block 210 if the target endianess is not equal to first endianess and to block 215 otherwise.

In block 210, the processing unit 150 may clear the ETR_bit135 based on the CEB instruction stored in the memory 190. In block 215, the processing unit 150 may set the ETR_bit135 based on the SEB instruction stored in the memory 190.

In block 220, the processing unit 150 may retrieve a data unit from the source memory such as the memory 190. In block 230, the processing unit 150 may check if the ETR_bit135 is set and control passes to block 240 if the ETR_Bit135 is set and to block 250 otherwise.

In block 240, the processing unit 150 may cause the endian conversion logic 160 to convert the endianess of the data unit from the first endian format to the second endian format. For example, the endian conversion logic 160 may convert the data unit stored in the big-endian format to the little-endian format.

In block 250, the processing unit 150 may cause the endian conversion logic 160 to convert the endianess of the data unit from the second endian format to the first endian format. For example, the endian conversion logic 160 may convert the endianess of the data unit from the little-endian format to the big-endian format.

In block 260, the processing unit 150 may cause the endian conversion logic 160 to store the data unit in the ETR175.

In block 270, the processing unit 150 may check if the data unit is transferred to a memory such as the ETDR 171-D, which is endian toggle disabled and control passes to block 280 if the data unit is to be transferred to the ETDR 171-D and to block 290 otherwise.

In block 280, the processing unit 150 may cause the transfer of the data unit, stored in the ETR175, to the ETDR 171-D without having the endian conversion logic 160 perform the endian conversion.

In block 290, the processing unit 150 may transfer the data unit, stored in the ETR175, to a destination memory after the endian conversion unit 160 performs the endian conversion.

An embodiment of a code snippet, with comments, written in IA-32 Assembly level language that uses the ETR175 for transparent endian conversion is illustrated below:

| | |
|---|---|
| SEB | ; Set the target endianness of ETR to Little-Endian. |
| MOV ETR, 0x0000ABCD | ; Address of a memory location 'X', in the memory 190, storing a big-endian value. After the MOV instruction is executed the value stored in the memory location 'X' in big-endian format is moved into ETR175 after the value is converted into little-endian format. |
| SUB ETR, 1 | ; Decrement the value stored in the ETR175 |
| MOV 0x0000ABCD, ETR | ; Store the value in ETR175 (in little-endian) back into the memory location 'X' in big-endian format. |

In one embodiment, the ETR175 may be accessed for programming in high-level language such as C/C++ programming languages. In one embodiment, a special storage class such as 'endian-storage class' may be defined for a compiler. In one embodiment, the endian-storage class may instruct the compiler to use the ETR175 for a pre-specified variable and the compiler may use the ETR175 if the compiler encounters the pre-specified variable.

An embodiment of a storage-class code snipet, with comments, written in 'C' programming language that uses the ETR175 for transparent endian conversion is illustrated below:

```
DEV_STATUS pc1_ctrl_dev( )
{
    endian int status_val;                      /*Instructs the compiler to allocate ETR175
                                                 for the pre-specified variable*/
    set_etr_bit( );                             /*API to set the ETR_Bit135*/
    status_val = *(DEV_CTRL_REG_ADDR);          /*Endian conversion happens transparently*/
    status_val = status_val – 1;                /*Decrement the status value*/
    *(DEV_CTRL_REG_ADDR) = status_val;          /*Endian conversion happens transparently */
    return 0xff;                                /* Some return status code */
}
```

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A processor comprising: a processing unit to retrieve a data unit of a first endian format; an endian conversion logic coupled to the processing unit to convert the data unit from the first endian format to a second endian format based on the status of a endian toggle register control bit; and an endian toggle register coupled to the endian conversion logic to store the data unit, wherein the endian conversion logic is to convert the second endian format of the data unit stored in the endian toggle register to the first endian format before storing the data unit in a first memory, wherein the endian conversion logic is to store the data unit of the second endian format in an endian toggle disabled register, wherein the second endian format of the data unit is preserved if the data unit is stored in the endian toggle disabled register, wherein the processing unit is to support an endian storage class, and wherein the processing unit causes endian conversion to be performed on a pre-specified variable of the endian storage class before storing the pre-specified variable in the endian toggle register.

2. The processor of claim 1, wherein the processing unit is to set the endian toggle register control bit after executing a set endian bit instruction, wherein setting the endian toggle register control bit designates the first endian format to the endian toggle register.

3. The processor of claim 2, wherein the processing unit is to clear the endian toggle register control bit after executing a clear endian bit instruction, wherein clearing the endian toggle register control bit designates the second endian format to the endian toggle register.

4. A method comprising: retrieving a data unit of a first endian format; converting the data unit from the first endian format to a second endian format based on the status of an endian toggle register control bit; and storing the data unit in the second endian format in an endian toggle register, converting the second endian format stored in the endian toggle register to the first endian format before storing the data unit in a first memory, storing the data unit of the second endian format in an endian toggle disabled memory, wherein the second endian format of the data unit is preserved if the data unit is stored in the endian toggle disabled register, and supporting an endian storage class on a compiler, wherein the endian storage class endian conversion to be performed on a pre-specified variable of the endian storage class before storing the pre-specified variable in the endian toggle register.

5. The method of claim 4 further comprising setting the endian toggle register control bit after executing a set endian bit instruction, wherein setting the endian toggle register control bit designates the first endian format to the endian toggle register.

6. The method of claim 5 further comprising clearing the endian toggle register control bit after executing a clear endian bit instruction, wherein clearing the endian toggle register control bit designates the second endian format to the endian toggle register.

7. A system comprising: a memory; a first processor to store a data unit in the memory, wherein the data unit is in a first endian format; and a second processor to retrieve the data unit, to convert the data unit to a second endian format based on the status of an endian toggle register control bit, and to store the data unit in an endian toggle register, wherein the second processor is to convert the second endian format of the data unit stored in the endian toggle register to the first endian format before storing the data unit in the memory, wherein the second processor is to store the data unit of the second endian format in an endian toggle disabled memory, wherein the second endian format is preserved if the data unit is stored in the endian toggle disabled memory, wherein the second processor is to support an endian storage class and wherein the second processor is to perform an endian conversion on a pre-specified variable of the endian storage class before storing the pre-specified variable in the endian toggle register.

8. The system of claim 7, wherein the second processor is to set the endian toggle register control bit after executing a set endian bit instruction, wherein setting the endian toggle register control bit designates the first endian format to the endian toggle register.

9. The system of claim 8, wherein the second processor is to clear the endian toggle register control bit after executing a clear endian bit instruction, wherein clearing the endian toggle register control bit designates the second endian format to the endian toggle register.

10. The system of claim 7, wherein the system is a network processor.

11. The system of claim 7, wherein the system is a client system.

* * * * *